G. F. KEENE.
CRANBERRY HARVESTER.
APPLICATION FILED OCT. 25, 1912.

1,090,860.

Patented Mar. 24, 1914.
2 SHEETS—SHEET 1.

Witnesses
Inventor
George F. Keene
By William S. Jones
Attorney

G. F. KEENE.
CRANBERRY HARVESTER.
APPLICATION FILED OCT. 25, 1912.

1,090,860.

Patented Mar. 24, 1914.

2 SHEETS—SHEET 2.

Witnesses
Geo. T. Soule
Alfred C. Pardy

Inventor
George F. Keene
By William S. Jones
Attorney

UNITED STATES PATENT OFFICE.

GEORGE F. KEENE, OF WHITMAN, MASSACHUSETTS, ASSIGNOR OF ONE-HALF TO ALFRED O. PARDEY, OF WHITMAN, MASSACHUSETTS.

CRANBERRY-HARVESTER.

1,090,860.  Specification of Letters Patent.  Patented Mar. 24, 1914.

Application filed October 25, 1912. Serial No. 727,800.

*To all whom it may concern:*

Be it known that I, GEORGE F. KEENE, a citizen of the United States, residing at Whitman, in the county of Plymouth and State of Massachusetts, have invented certain new and useful Improvements in Cranberry-Harvesters, of which the following is a specification.

My invention relates to a cranberry harvester, and the object thereof is to provide a device of this character which is designed to be propelled in any desirable manner over the crop of berries to automatically gather and deposit them in a suitable bin or receptacle.

Another object of my invention is to provide means in the nature of a pair of raking scoops which are rotatably mounted and otherwise arranged so that they will collect or pick the berries during the lower portion of their travel and be operated automatically to deposit the berries in the arc of travel of their upward stroke.

A further object contemplated by my invention is the provision of a scoop which may be adjusted in any desired position with respect to its supports thereby facilitating and expediting the harvesting of the berries under varying conditions.

To the accomplishment of the recited objects and others coördinate therewith, the preferred embodiment of my invention resides in that construction and arrangement of parts hereinafter described, illustrated in the accompanying drawings, and embraced within the scope of the appended claims.

Figure 1:
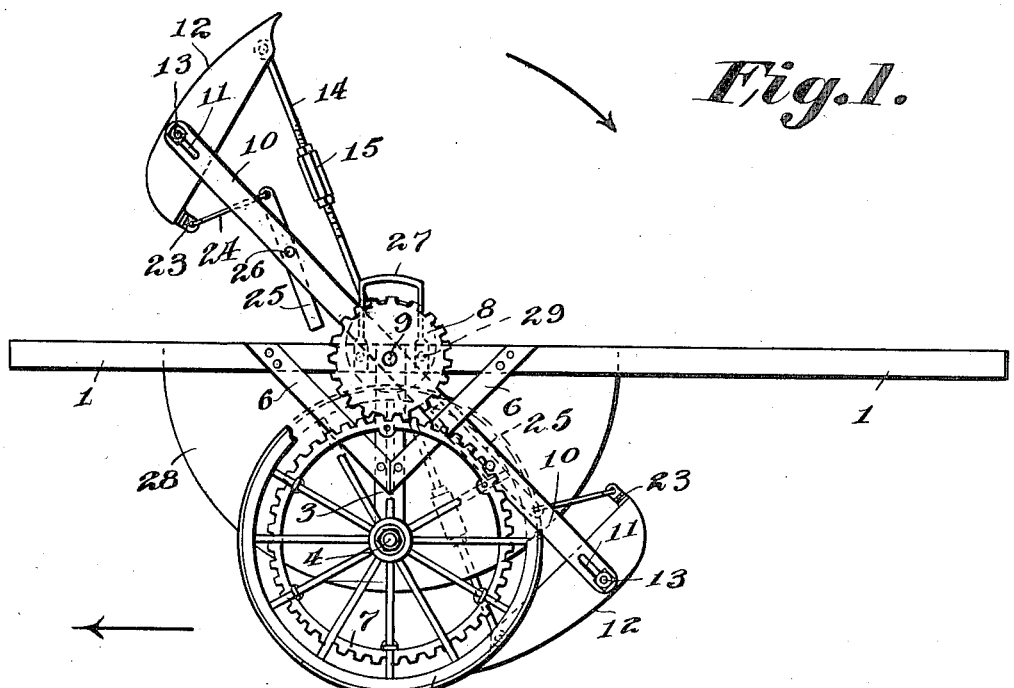
Figure 2:
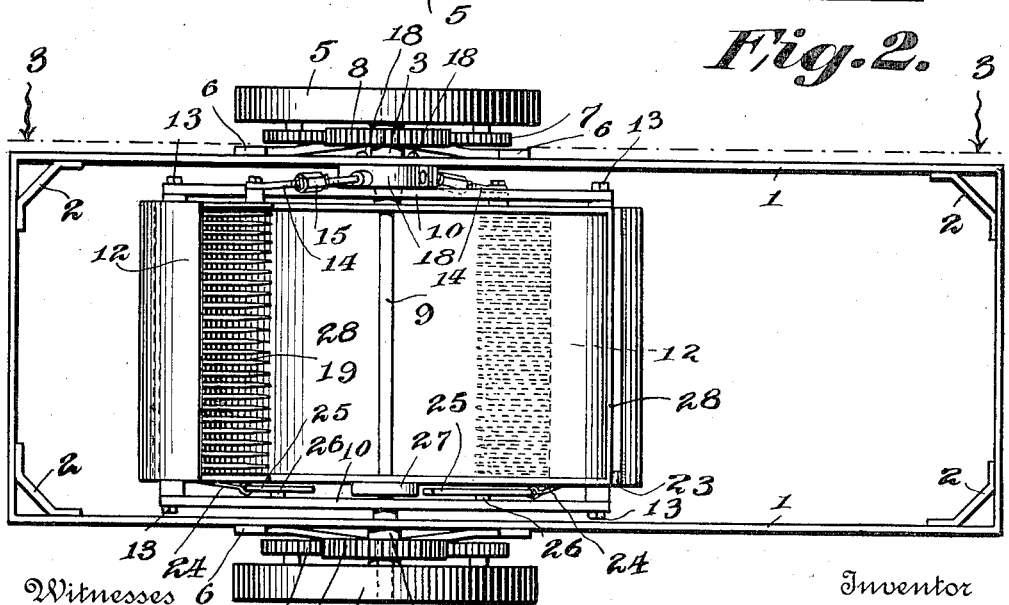
Figure 3:
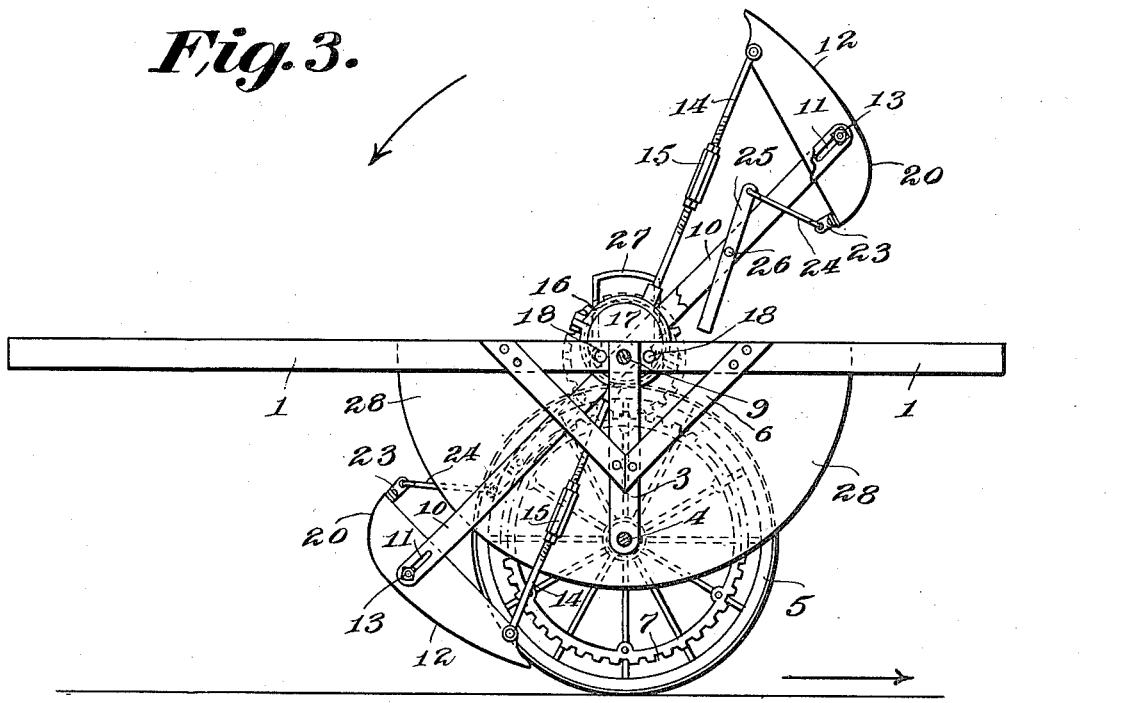

In said drawings: Figure 1 is a side elevation of the harvester embodying my invention, the adjacent wheel being broken away to more clearly show the construction. Fig. 2 is a top plan view of the machine. Fig. 3 is a vertical longitudinal section taken upon line 3—3 of Fig. 2, and Fig. 4 is a vertical central longitudinal section through one of the scoops.

Referring more particularly to the drawings for a detail description of my invention, the numeral 1 designates a substantially rectangular shaped frame provided at each corner with suitable angular braces, as 2, and having depending from each side thereof a hanger 3, which carries a stub-shaft 4 at its lower terminal adapted to receive a traction wheel 5. Each hanger is reliably supported by the right angular brace 6 secured thereto and the upper ends of which are secured to the sides of the frame 1, and each traction wheel is equipped with a spur-gear 7 meshing at the top thereof with a pinion 8 rigidly secured to the transversely extending shaft 9. Mounted upon this shaft and adapted to revolve therewith is a frame comprising a pair of side pieces or beams 10, the outer ends of which are provided with elongated slots 11 for adjustably securing the scoops 12 pivotally mounted with respect thereto upon the bolt 13. As clearly exhibited in Figs. 1 and 3 of the drawings, these scoops have their front ends connected by rods 14 to an eccentric strap 16, a turn-buckle 15 being located centrally of each rod. The said eccentric strap is slidably mounted upon the eccentric 17, which is preferably bolted at 18 to the main frame 1.

Figure 4:
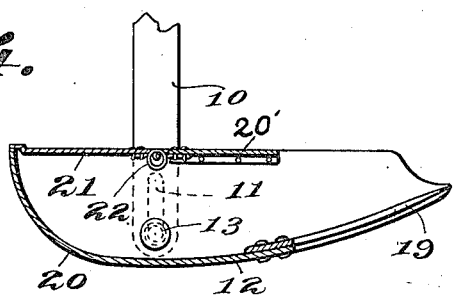

As will be found upon inspection of Fig. 4 of the drawings each scoop comprises a front portion fashioned in the form of a rake 19 and a rear imperforate portion 20. Above the imperforate portion 20 is a transversely extending brace 20' and a trap door 21, the latter being connected to said brace by the spring hinge 22. Furthermore, each trap door carries an outwardly extending ear 23, as best seen in Figs. 1 and 3, and this ear is connected by a link 24 to the outer terminal of an arm 25 pivotally mounted at 26 to the inside of a respective side piece 10 of the revoluble frame. The lower terminal of the arm 25 is designed to be arranged so as to contact with a curved tripper 27 secured to the upper edge of the bin or main receptacle 28 at 29.

In operation the complete machine as hereinbefore described is manually propelled over the crop, and by reason of the fact that the traction wheels 5 are connected to the shaft 9 by means of the spur-gear 7 and the pinion 8 motion will be transmitted to said shaft and in turn to the frame comprising the side beams 10. It follows that as this frame revolves the rake portion 19 of the scoop will pick the berries from the bushes during the lower portion of its travel, and when the scoop rises the lower extremity of the arm 25 will engage the curvilinear edge of the tripper 27 and through the medium of the link 24 swing the trap-door 21 outwardly. At the same time the rod 14, due to the fact that it is eccentrically mounted at its lower extremity, will elevate the forward end of the scoop so that all of the berries contained therein will gravitate or fall into the main bin 28. As the frame continues to revolve the arm 25 passes beyond the tripper 27 and the trap-door is caused to resume its normal closed position by the coil spring 22.

As previously explained, each scoop 12 may be adjusted longitudinally relative the side pieces 10 by means of the elongated slots 11 and the bolts 13. It is also to be noted that the forward end of the scoop may be adjusted by appropriately manipulating the turn buckle 15, whereby provision is made for adapting the harvester to various conditions according to the nature of the ground and the size of the bushes.

It should be understood that in its broader aspect the invention comprehends the employment not only of the various means described but of equivalent means for performing the recited functions. For example, I have illustrated a manually propelled harvester, but it will be obvious that I may employ a gasolene or electric motor and effectively accomplish the same results.

What is claimed, is:—

1. In a cranberry harvester, the combination of a wheeled frame carrying a bin, a shaft mounted transverse of said frame and connected with the wheels thereof for revoluble movement, arms fixedly secured to said shaft and carrying scoops at their outer ends, each scoop having a trap door, an eccentric rigidly mounted on said frame, an eccentric-strap in operative relation with said eccentric, a connection between the forward end of each scoop and said eccentric-strap for tilting the scoop, arms pivoted to respective scoop supporting arms and connected respectively to said trap doors, and a tripper mounted in the path of movement of said pivoted arm.

2. The combination of a wheeled frame carrying a bin, a shaft mounted transversely of said frame and connected with the wheels thereof for revoluble movement, arms secured to said shaft and carrying scoops at their outer ends, each scoop having a trap-door, arms pivoted to respective scoop supporting arms and connected respectively to said trap doors, a tripper mounted in the path of movement of said pivoted arms for opening the trap doors, and means connected to the forward end of said scoops for tilting the same when they reach the height of their upward movement.

3. The combination of a wheeled frame carrying a bin, a shaft mounted transversely of said frame and connected with the wheels thereof for revoluble movement, arms secured to said shaft and carrying scoops at their outer ends, each scoop having a trap door, an eccentric rigidly mounted on said frame, an eccentric-strap in operative relation with said eccentric, a connection between the forward ends of said scoops and said eccentric-strap for tilting said scoops, and means for opening the trap-doors as the scoops approach their highest point.

4. In a cranberry harvester, the combination of a wheeled frame carrying a bin, a shaft mounted transversely of said frame and connected with the wheels thereof for revoluble movement, a frame mounted upon said shaft, scoops pivotally mounted at each end of said frame, means for rocking each scoop when in its uppermost position, a closure for a portion of each scoop, and means for actuating said closure to permit emptying of the scoops.

5. In a cranberry harvester, the combination of a frame provided with wheels, a bin mounted upon said frame, a pair of scoops, a support for said scoops, means connecting the wheels and said support for rotating the latter, berry-picking devices carried by said scoops, said scoops being pivotally mounted and each provided with a movable closure for a portion thereof, means for moving each scoop upon its pivot when it reaches a point above said bin, and means for moving said closures to permit emptying of the scoops.

In testimony whereof I hereunto affix my signature in presence of two witnesses.

GEORGE F. KEENE.

Witnesses:
  GEO. D. SOULE,
  ALFRED O. PARDEY.

---

Copies of this patent may be obtained for five cents each, by addressing the "Commissioner of Patents, Washington, D. C."